Aug. 7, 1928.

W. H. WAKEFIELD

1,679,641

WEFT REPLENISHING PICK AND PICK LOOM

Filed March 28, 1925       7 Sheets-Sheet 1

INVENTOR:
WALTER H. WAKEFIELD
ATTORNEYS.

Aug. 7, 1928.

W. H. WAKEFIELD 1,679,641

WEFT REPLENISHING PICK AND PICK LOOM

Filed March 28, 1925 — 7 Sheets-Sheet 3

Aug. 7, 1928.
W. H. WAKEFIELD
1,679,641
WEFT REPLENISHING PICK AND PICK LOOM
Filed March 28, 1925
7 Sheets-Sheet 4

INVENTOR
WALTER H. WAKEFIELD
ATTORNEYS

Aug. 7, 1928.

W. H. WAKEFIELD

1,679,641

WEFT REPLENISHING PICK AND PICK LOOM

Filed March 28, 1925    7 Sheets-Sheet 6

INVENTOR
WALTER H. WAKEFIELD
ATTORNEY

Patented Aug. 7, 1928.

1,679,641

UNITED STATES PATENT OFFICE.

WALTER H. WAKEFIELD, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS.

WEFT-REPLENISHING PICK-AND-PICK LOOM.

Application filed March 28, 1925. Serial No. 19,130.

This invention relates to a weft replenishing loom of the type in which a plurality of shuttle boxes are provided on each end of the loom and in which the picking mechanism is so constructed that a shuttle may be picked from either side of the loom on any desired pick. This type of loom is used largely in the weaving of fine fabrics in which the pattern may call for the insertion of a single pick of a certain kind or color of filling. In such looms, it is common to use more shuttles than there are boxes at either side of the loom. Consequently the shuttles are shifted about from one box to another during the operation of the loom, and the same shuttle may at different times occupy any one of the different boxes on either side of the loom.

It is the object of my invention to provide a construction by which a weft carrier of the corresponding kind or color may be inserted in a substantially exhausted shuttle, regardless of the particular box which said shuttles occupy.

To the attainment of this object, I provide a detector for indicating the exhaustion of filling, located at the drop box side of the loom and remote from the magazine. I also provide a color indicator or releasing device for the magazine which is so controlled that it will always correspond to the kind or color of weft in the running shuttle, regardless of the position of said shuttle in the shuttle boxes.

To the attainment of this general object, I provide many novel features of construction and I particularly provide a set of indicating blocks, each block representing a particular shuttle and being moved to correspond with the position and movement of the shuttle in the boxes. The blocks preferably receive their motion direct from the drop box pattern chain, so that they may be positioned in advance of the corresponding movements of the drop boxes.

Many other features of my invention will be hereinafter described and more particularly pointed out in the appended claims.

A preferred form of the invention is shown in the drawings, in which

Fig. 2 is an end elevation, partly in section, taken along the line 2—2 in Fig. 1;

Fig. 3ª is a detail plan view, looking in the direction of the arrow 3ª in Fig. 3;

Briefly described, my improved loom comprises a set of the usual vertically movable drop boxes at one side of the loom and a second set of horizontally shifting shuttle boxes at the opposite or magazine side of the loom, which latter boxes may be of any desired type and which are shown herein as of the type disclosed in the prior patent to Eccles, No. 7,137, issued March 5, 1850. The boxes are controlled from a dobby head which is in general of a usual and well known type.

The weft detector is mounted at the drop box side of the loom and is so connected to the pattern mechanism that it will always co-operate with the running shuttle. I have also connected the weft detector so that it will render the picking mechanism, the dobby and the box motion which it controls, and the take-up all inoperative upon indication of weft exhaustion.

The magazine for my impoved loom is of special construction as to certain features and I have provided a special indicating mechanism therefor, by which the color slide or color indicator of the magazine will always correspond in position to the kind or color of weft in the running shuttle, regardless of the particular shuttle box in which said shuttle is located at any given time.

By the co-operation of these several devices, weft exhaustion will be indicated in a shuttle at the drop box side of the loom and the exhausted weft carrier will be replaced immediately after the shuttle reaches the magazine side of the loom and regardless of the particular shuttle box in which it may be located at either side of the loom.

Having described the general construction and operation of my improved loom, I will now describe the specific structure of the different mechanisms which co-operate to produce the results above set forth.

*Detecting mechanism.*

Figures 4, 5, 6, 7, 8, 22, 23:
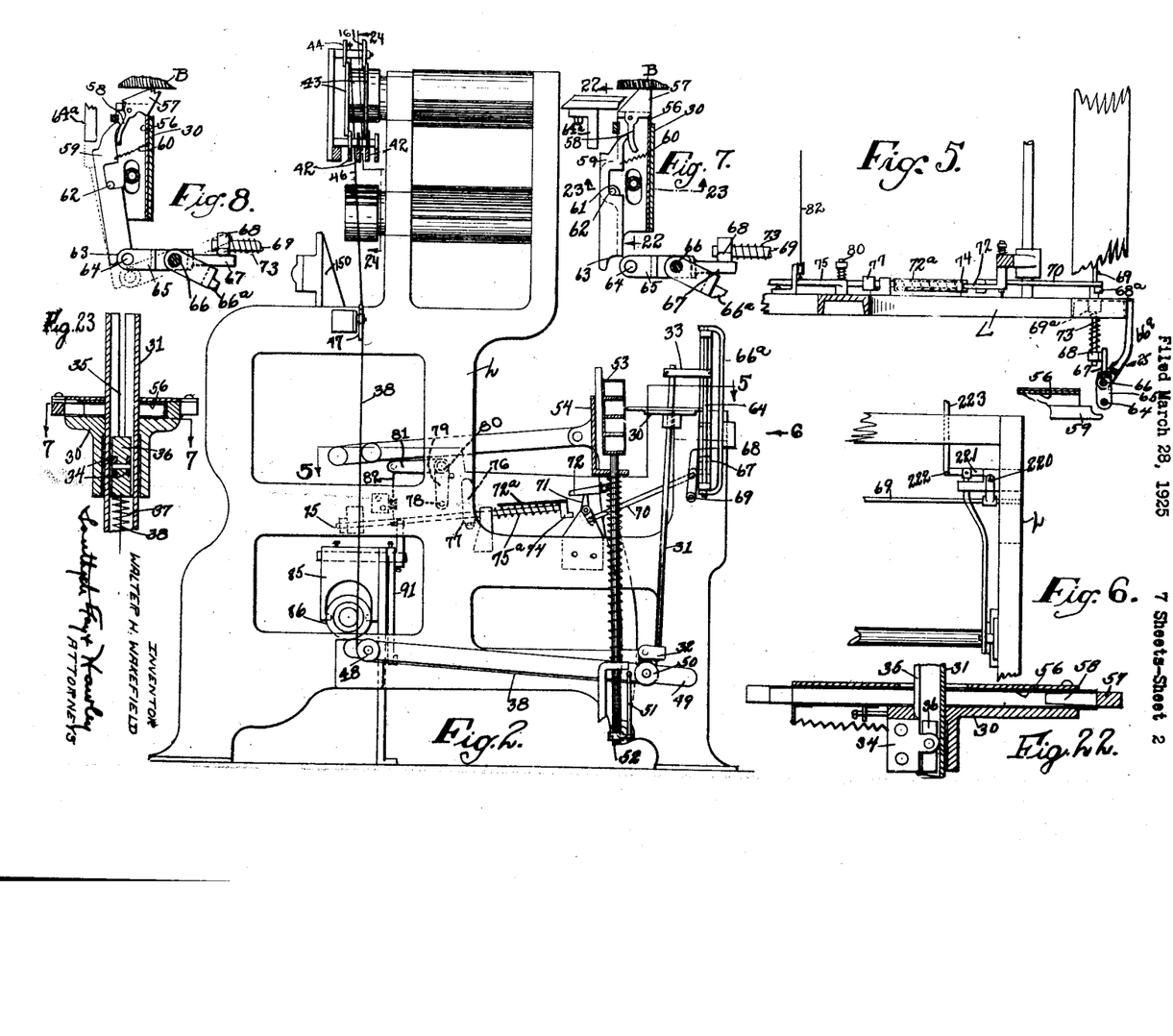
Fig. 5 is a partial sectional plan view, taken along the line 5—5 in Fig. 2.
Fig. 6 is a front elevation of certain parts at the magazine side of the loom, looking in the direction of the arrow 6 in Fig. 2.
Fig. 7 is a sectional plan view of the detector mechanism.
Fig. 8 is a view similar to Fig. 7, but showing the parts in a different position.
Fig. 22 is an enlarged sectional elevation of the weft detector, taken along the line 22—22 in Fig. 7.
Fig. 23 is an enlarged transverse sectional elevation of the weft detector, taken along the line 23—23 in Fig. 7.

I will first describe the mechanism for detecting the exhaustion of filling in the running shuttle. For this purpose I provide a detector stand 30 (Figs. 2 and 22) which is mounted for vertical sliding movement on a hollow tube 31 secured to bracket 32 and bearing 33 both of which move with the tube 31. Plates 34 (Fig. 22) are fixed to the lower part of the stand 30 and project through an elongated slot 35 in the tube 31 to the inside of the tube, where they are secured to a sliding block 36 (Figs. 22 and 23). A coil spring 37 (Fig. 23) forces the block 36 yieldingly upward, carrying the stand and weft detector with it and a wire, or other flexible member 38 is provided for pulling the stand downward against the pressure of the spring 37. The mechanism for pulling the cord 38 downward is substantially similar to that shown in the prior patent to Ryon, No. 1,205,792, issued November 21, 1916.

Figure 26:
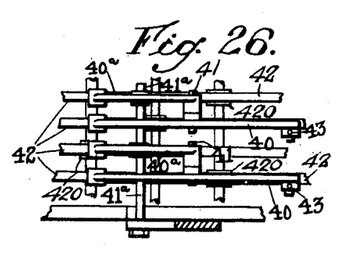
Fig. 26 is an enlarged horizontal section on line 26—26 of Fig. 1 showing details of the pattern chain controlled levers.

Briefly described, this mechanism comprises a lever 40 mounted on a movable pivot 41 (Figs. 24 and 26) and engaging one of the usual vibrator levers 42 (Fig. 2). The pivot 41 is on a second lever 40ª mounted on a fixed pivot 41ª and engaging a second vibrator lever.

The vibrator levers 42 are selectively positioned by pattern rolls 420 (Figs. 1, 24 and 26) mounted on the usual pattern chain 421, periodically advanced by an intermittently actuated driving cylinder 422, or the vibrator levers may be positioned by other suitable pattern mechanism, such mechanism being the usual commercial structure for controlling the drop boxes for a pick and pick loom and in itself forming no part of my present invention.

The lever 40 is connected by a link 43 to a lever 44 pivoted at 45 and having a cord 46 (Fig. 1) connected thereto. At its lower end, the cord 46 is connected to one arm of a bell crank 47, and the cord 38 previously described is connected to the second arm of the bell crank 47.

The cord 38 passes around a guide pulley 48 (Fig. 2) mounted on the pivot of a swinging arm or lever 49. The cord 38 is then passed around a second guide pulley 50 on the swinging end of the lever 49 and from the pulley 50 passes directly into the tube 31.

The lever 49 is connected by a link 51 to the lifter rod 52 which supports the drop boxes 53 on the lay 54. The lever 49 thus rises and falls with the drop boxes 53, maintaining the detector stand 30 aligned with a given shuttle box 53 as the latter moves upward or downward. When a change is called for in the position of the shuttle boxes, the detecting device is moved up or down on the tube 31 in accordance with the movements of the vibrator levers 42, this change being made as soon as the pattern chain is advanced and before the drop boxes have been shifted. For a more detailed description of the mechanism for aligning the weft detector with the running shuttle box, reference is made to the patent to Ryon above cited.

The details of one form of weft detecting mechanism suitable for my purposes are shown in Figs. 7 and 8. A slide 56 is mounted in a guideway in the stand 30 and is provided at its rear end with a pivoted detecting member 57 having a forwardly projecting arm 58. The arm 58 engages the rear portion of a plate 59 which is movably mounted on the slide 56 and which is normally held in the rearward position indicated in Fig. 7 by a spring 60, which causes a shoulder 61 on the plate 59 to engage a pin 62 on the slide 56.

When the detecting member 57 engages a bobbin having a sufficient amount of weft thereon, the parts will be moved directly forward and no indication of weft exhaustion will be given. But when the weft is substantially exhausted, the member 57 will slide along the bobbin B, as indicated in Fig. 8, swinging the plate 59 about the stud 62 and causing the recessed front end 63 of the plate 59 to engage a rod 64 (Figs. 2 and 25) extending vertically adjacent the detecting mechanism and secured at its opposite ends in a frame 65 swinging about a fixed pin 66. A shoulder at the rear end of the plate 59 is thus positioned in the path of a projection 64$^a$ carried by the lay and the plate 59 is forced forward thereby.

Figure 25:
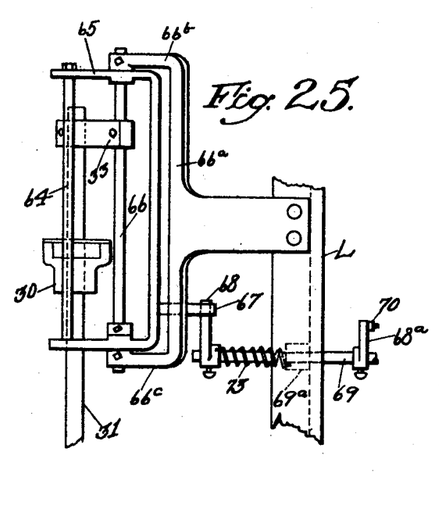
Fig. 25 is an enlarged detail front elevation of the weft detecting mechanism looking in the direction of arrow 25, Fig. 5.

Fig. 25 shows the manner in which the rod 64, frame 65, and pin 66 are mounted. A stand 66$^a$ is bolted to the loom frame L and has upper and lower arms 66$^b$ and 66$^c$, respectively, in which is fastened the pin 66. Guide 33 for the upper end of tube 31 slides on pin 66 without disturbing the rod 64 and the parts operated thereby. An arm 67 formed on frame 65 extends behind and engages said frame to limit rearward motion of rod 64.

Said arm 67 projects from the frame 65 in position to engage a vertical arm 68 (Fig. 2) secured on a cross shaft 69 journalled in bearing 69$^a$ in frame L. A second arm 68$^a$ is secured to shaft 69 and is connected by link 70 to a swinging support 71 which normally holds a latch 72 on the lay 54 in raised position, as indicated in Fig. 2. A torsion coil spring 73 (Fig. 7) on the shaft 69 presses the arm 68 yieldingly against the arm 67 and the latter engages stand 66$^a$ to maintain the parts in the position shown in Figs. 5, 7, and 25. One end of said spring 73 is secured to arm 68 and the other end to bearing 69$^a$ in frame L.

Upon indication of weft exhaustion, the frame 65 and arm 67 are moved by the projection 64$^a$ to the position indicated in dotted lines in Fig. 8, rocking the arm 68 and shaft 69 and permitting the latch 72 to move downward into alignment with the head 74 of a spring pressed sliding rod 75 (Fig. 2). When this rod is moved rearward an arm 76 of a collar 77 on the rod 75 engages a stud 78 in a bell crank 79 pivoted at 80 to the loom frame. The rearwardly projecting arm 81 of the bell crank 79 is connected by a cord 82 (Fig. 1) to the upper end of a lever 83 mounted on a fixed pivot 84 and having a depending portion 85 engaging a collar 86 slidable on the picking shaft 87. The collar 86 is connected by links 88 to pick arms 89, said links being reversely connected to the arms so that movement of the collar in the direction of the arrow $a$ in Fig. 1 will withdraw the pick rolls 90 from operative position.

The lever 83 is also connected through an arm 91 (Fig. 1) and link 92 to a lever 93 which engages a clutch collar 94 (Fig. 3), keyed to a reduced end portion of the picking shaft 87. The clutch collar 94 is held yieldingly in driving position by a spring 95 (Fig. 1) but may be moved from driving position by movement of the arm 93. The clutch collar 94 has an offset lug 96 (Fig. 4) which engages a corresponding recess 97 in the hub of a gear 98 (Fig. 3) through which connection is made to the dobby drive shaft 99. Connection is also made from the shaft 99 through a pair of bevel gears 100 to drive the loom take-up motion.

It will thus appear that engagement of the latch 72 with the head 74 of the rod 75 will force the rod rearward and will cause disengagement of the dobby, box motion, and take-up motion and will also render the picking mechanism inoperative. The collar 77 is so positioned on the rod 75 that its arm 76 will not engage the stud 78 until the lay 54 has moved backward from front center far enough to permit picking of the indicated shuttle to the magazine end of the loom. A shield 72$^a$ extends rearwardly over rod 75 to hold the latch 72 elevated and away from compression spring 75$^a$ on non-indicating backward movements of the lay.

*Magazine and box mechanism.*

Figures 9, 24:
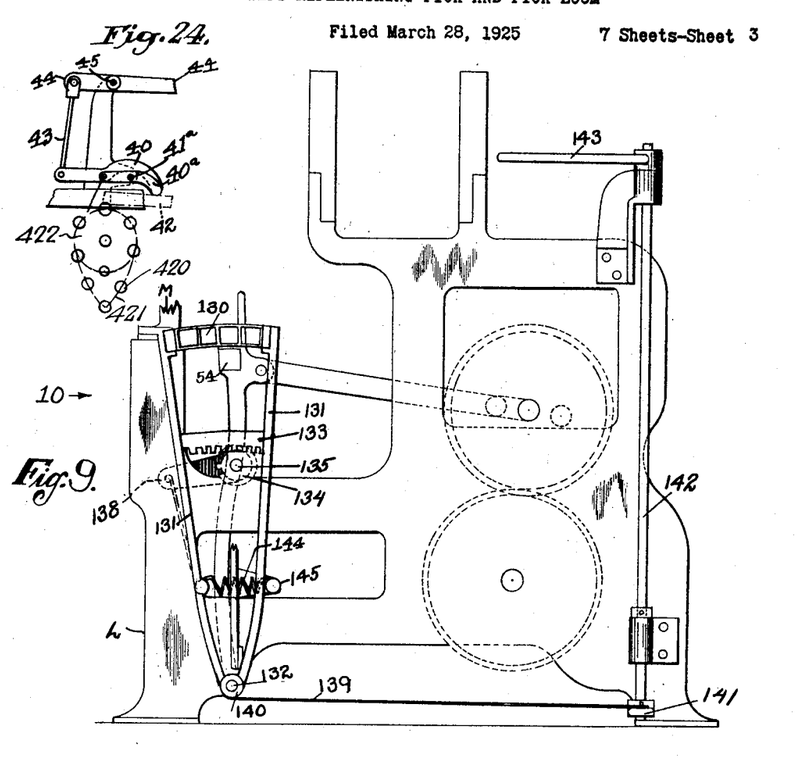
Fig. 9 is a side elevation of the loom at the magazine end, looking in the direction of the arrow 9 in Fig. 1.
Fig. 24 is a detail sectional front elevation, taken along the line 24—24 in Fig. 2.
Figure 12:
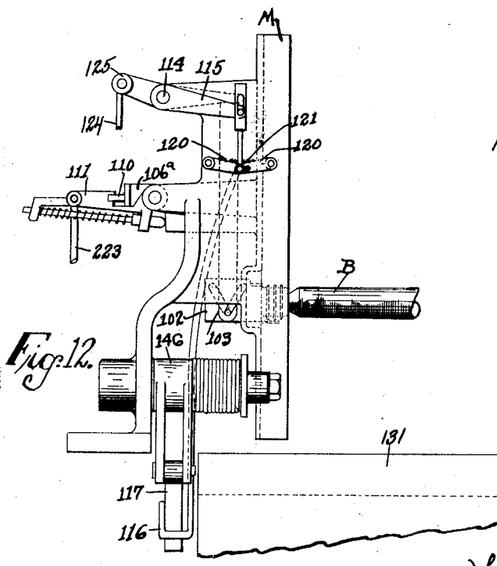
Fig. 12 is a front elevation of the magazine, looking in the direction of the arrow 12 in Fig. 11.
Figure 13:
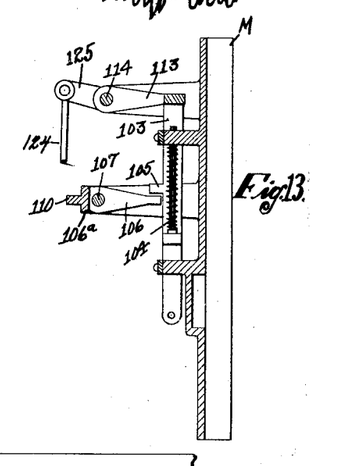
Fig. 13 is a sectional front elevation of certain parts, taken along the line 13—13 in Fig. 11.

I will now describe the magazine and the horizontally shifting shuttle box mechanism associated therewith, which is best shown in Figs. 9 and 13. I have shown my improved loom as provided with four shuttle boxes at each end of the lay and I have shown the magazine as arranged for the storage and release of seven different colors of bobbins or weft carriers. The bobbins of each color are held in their respective vertical compartments by a pair of oppositely sliding plates or supports 102 (Figs. 11 and 12) of the type fully shown and described in the prior patent to Ryon No. 1,005,321, issued October 10, 1911. Each pair of supports is normally occupied by a bobbin which is released when the supports move relatively to each other, another bobbin of the same kind falling into the supports when they return to normal position.

Figure 11:
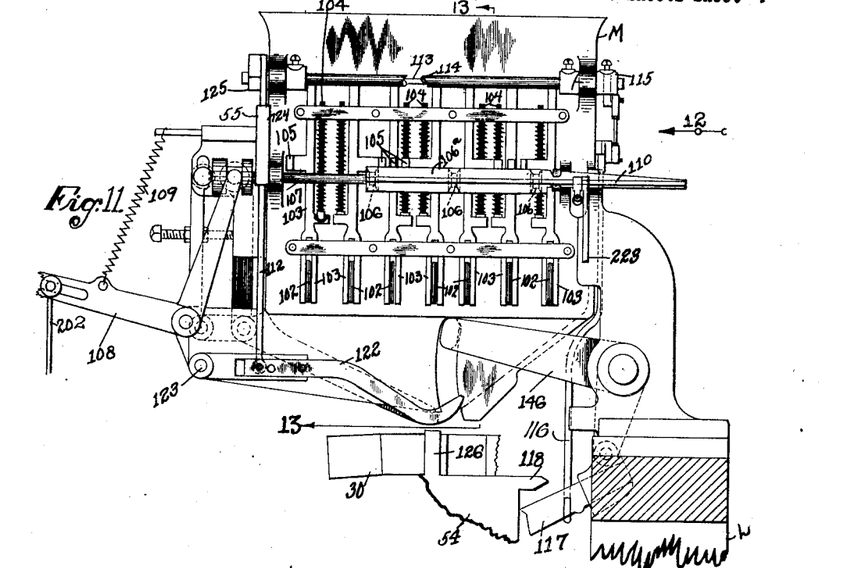
Fig. 11 is a side elevation of the magazine, with certain parts of the loom shown in section along the line 11—11 of Fig. 1.

These supporting plates are controlled by slides 103 (Figs. 11 and 13), a separate slide being provided for each magazine compartment and each slide being yieldingly pressed downward by a spring plunger 104. Each slide is provided with a projection 105 positioned for engagement by one of a series of lifting fingers 106 formed on a frame 106ª mounted on a rock shaft 107. The fingers 106 and shaft 107 are movable axially by a bell crank 108 (Fig. 11) which is operated by a color indicating mechanism to be described. A spring 109 normally moves the shaft 107 to the right as indicated in Fig. 11. An elongated flange 110 (Figs. 12 and 13) projects from the frame 106ª of the lifter fingers 106 and is positioned by a notched arm 111 which rocks the frame to raise the fingers 106 upon indication of transfer.

When a slide 103 is moved upward, it engages an upper arm 113 on a top shaft 114 (Fig. 13) and thus rocks an arm 115 (Fig. 12) to raise a U-shaped link 116 and swing a transferrer latch 117 (Fig. 11) into position for engagement by the dagger 118 on the lay 54. Toggle arms 120 (Fig. 12) and a spring 121 are provided for holding the latch yieldingly in raised position long enough to permit engagement of the latch by the dagger 118.

A shuttle feeler 122 (Fig. 11) is pivoted at 123 to the magazine frame M and is connected by a link 124 (described more particularly hereinafter) to an arm 125 (Fig. 12) fixed on the top shaft 114. As the lay 54 (Fig. 11) approaches its extreme forward position, a projection 126 at the back side of the lay engages the shuttle feeler 122, forcing the same upward and thus depressing the arms 115 (Fig. 12) and 113 (Fig. 13), reversing the toggle arms 120 and restoring latch 117 and link 116 to their original or normal positions.

Figure 10:
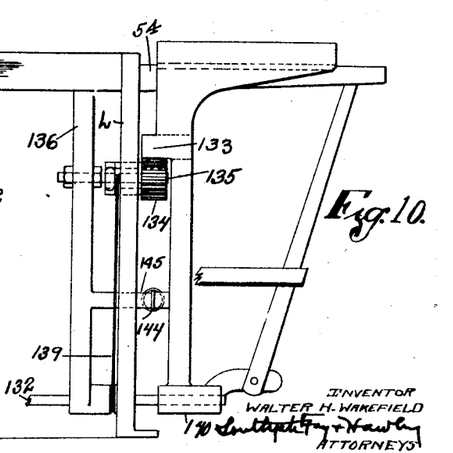
Fig. 10 is an elevation of certain parts, looking in the direction of the arrow 10 in Fig. 9.

The shifting shuttle boxes 130 (Fig. 9) at the magazine end of the loom are mounted on a box supporting frame 131 pivoted to the loom side at 132. The frame 131 has a circular rack 133 engaged by a pinion 134 (Fig. 10) rotatable on a stud 135 which is fixed in a sword 136 which supports the lay 54 (Fig. 9). An arm 138 is secured to the pinion 134 and has a cord 139 connected thereto. The cord 139 passes around a guiding pulley 140 adjacent the pivot of the frame 131 and is secured at its rear end to an arm 141 fixed on a vertical rock shaft 142. A second arm 143 is secured to the upper end of the rock shaft 142 and is actuated by connections to be described.

The arm 138 and pinion 134 act to shift the boxes 130 forward and the boxes are moved rearward by a heavy tension spring 144 secured at its front end to a portion of the frame 131 and at its rear end to a finger 145 on the sword 136. The shuttle boxes 130 are open at their upper and lower sides to permit the insertion of a fresh bobbin and the ejection of an exhausted bobbin in the usual manner, such bobbin transfer being accomplished by the transferrer 146 (Fig. 11) of the replenishing mechanism.

Figure 27:
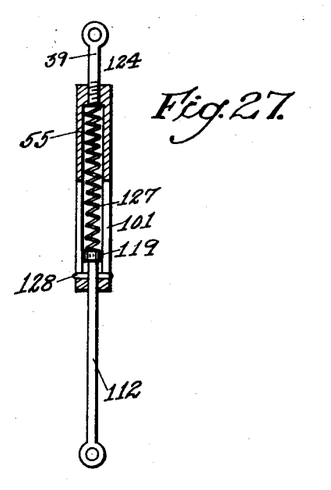
Fig. 27 is an enlarged front elevation, partly in section, of the link connecting the shuttle feeler with the top shaft of the magazine.
Figure 28:
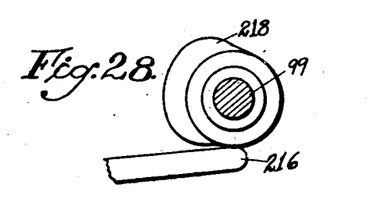
Figs. 28, 29, and 30 are horizontal sections on lines 28—28, 29—29, and 30—30 of Fig. 14, respectively, showing the various control cams on the upright shaft in the positions they occupy immediately after the pattern chain has positioned the blocks.
Figure 29:
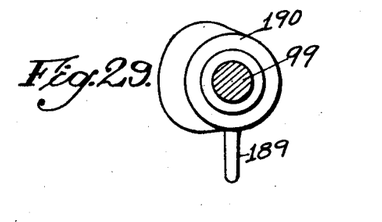
Figure 30:
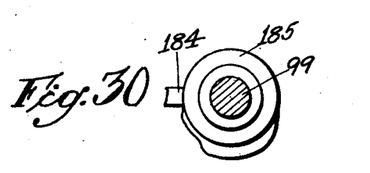

In the operation of the pick and pick loom as shown herein the indication of weft exhaustion comes at front center, but at this time the projection 126 on the lay is under the shuttle feeler 122 and the latter is therefore not free to descend to raise the latch 117. To prevent breakage in such an event I make the link or connector 124 of special construction as shown in Fig. 27. The upper part 39 of the connector is threaded into a sleeve 55 having a radial longitudinal slot 101 therein. The lower part 112 of the connector has a head 119 movable in the bore of the sleeve and pressed downwardly by spring 127. A pin 128 extending through the part 112 engages the bottom of the sleeve to limit down motion of the head 119. When weft indication occurs the spring 127 will be compressed as shuttle feeler 122 is lowered on projection 126 and after said projection moves rearwardly the shuttle feeler 126 will be lowered to permit latch 117 to rise to operative position. Other devices may be used to accomplish this same result and I do not wish to be limited to the use of a yielding connector.

Shuttle indicating mechanism.

I will now describe the novel devices by which I indicate the positions of the different shuttles in the drop boxes at the two ends of the lay and by which I co-ordinate the movements and positions of the magazine lifter arms 106 (Fig. 11) with the changing positions of the different shuttles. For this purpose I provide a frame or support 150 (Fig. 16) on which a pair of plates or supports 151 and 152 are mounted for vertical sliding movement. Each support 151 or 152 is provided with a series of horizontal recesses 154 (Fig. 19) in which a series of indicating blocks 155 are freely movable. The blocks 155 are held from displacement by cover plates 156.

Each block 155 (Fig. 21) is provided with a lug or projection 157 on its outer face and these projections vary in height, each block having a projection of different height and each block being assigned to represent a particular shuttle in the loom. Each of the indicating blocks 155 is provided with a notch 170 (Fig. 21) in its rear face, adapted to be engaged by a spring pressed plunger 171 (Fig. 19), so that it will be yieldingly retained in its recess 154.

The supports 151 and 152 are moved vertically on the frame 150 to correspond to indicated movements of the shifting horizontal boxes 130 (Fig. 9) and of the drop boxes 53 (Fig. 2), respectively. For such movement, the supports 151 and 152 are connected to rods or links 158 and 159 (Fig. 1), link 159 for support 152 being connected at its upper end to the indicating lever 44 previously described. The rod 158 for support 151 is connected to a second indicator lever 161. Springs 160 are connected to the rods 158 and 159 and lower the same when permitted to do so by levers 44 and 161. Each of these levers is positioned by a compound lever 40—40$^a$ controlled by two vibrator levers 42, as previously explained and as more fully shown and described in the prior patent to Ryon, No. 1,205,792.

By this construction, the supports 151 and 152 are shifted vertically to correspond to the movements of the boxes and are moved to their new positions as soon as a change in the boxes is indicated and before the change actually takes place.

A pair of plungers 172 and 173 (Fig. 14) are mounted in bearings in the frame 150 and are positioned to engage a block 155 corresponding to the running shuttle, moving the block from one side to the other in accordance with the movements of the shuttle. The plungers 172 and 173 are actuated by levers 174 and 175 and are yieldingly withdrawn by springs 176. The lever 174 has a hook 177 movable into and out of engaging position with a hook 178 on the lower end of an actuating lever 180. The lever 175 has a corresponding hook 181 movable into and out of engagement with a hook 182 pivoted to the upper part of the actuating lever 180. Levers 174 and 175 are provided with stop screws 174$^a$ and 175$^a$ which engage frame 150 to limit outward movement of the plungers.

The lever 180 is connected by a link 183 to an arm 184 which engages a cam 185 on the dobby drive shaft 99 previously described. The cam 185 makes one revolution for each revolution of the picking shaft 87 and through the connections described causes the blocks 155 to duplicate the movement of the active shuttle. Spring 184$^a$ holds the arm 184 against cam 185 and the latter is so formed as to move the hooks 178 and 182 slightly beyond the hooks 177 and 181, respectively, when the plungers are arrested by their stop screws, to permit easy disengagement of the hooks.

Figure 14:
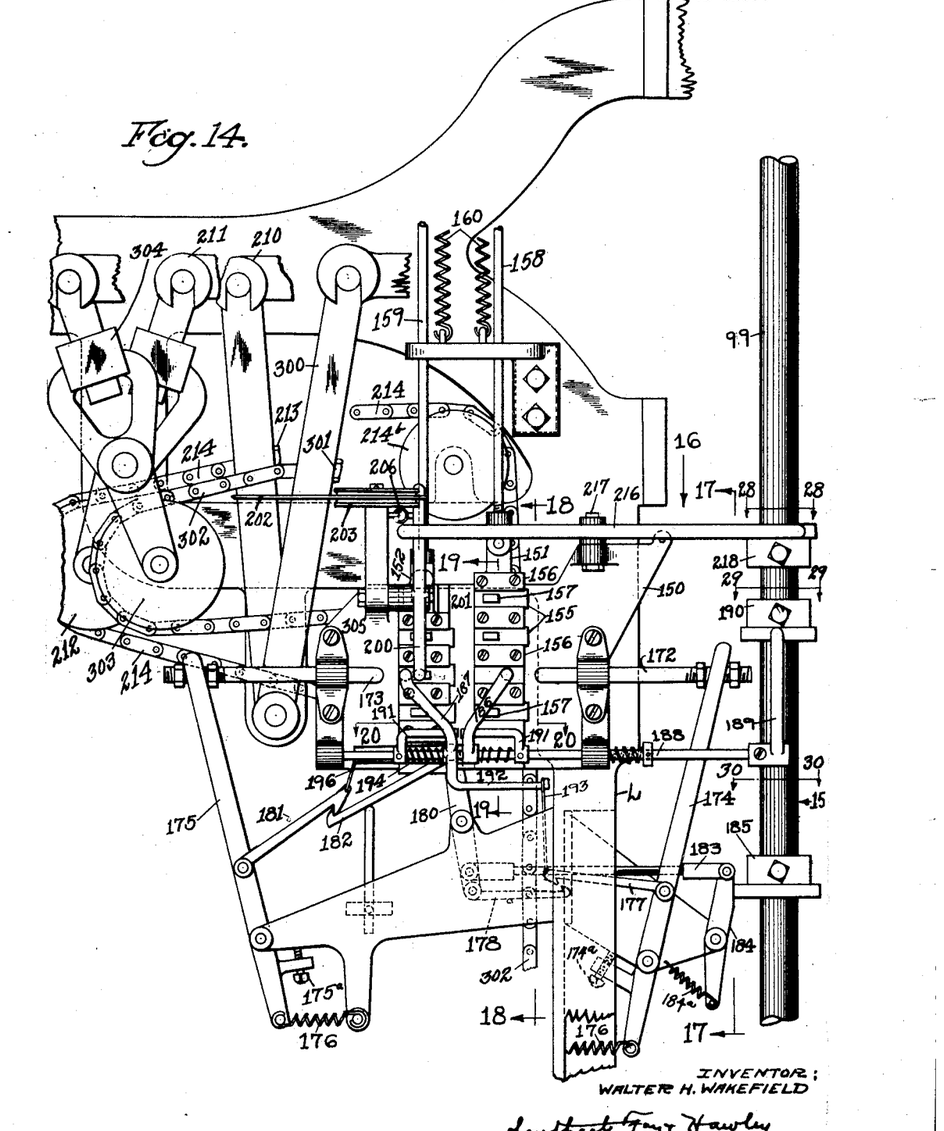
Fig. 14 is an enlarged rear elevation of the color selecting and indicating mechanism shown in Fig. 1.
Figures 16, 18, 19, 21:
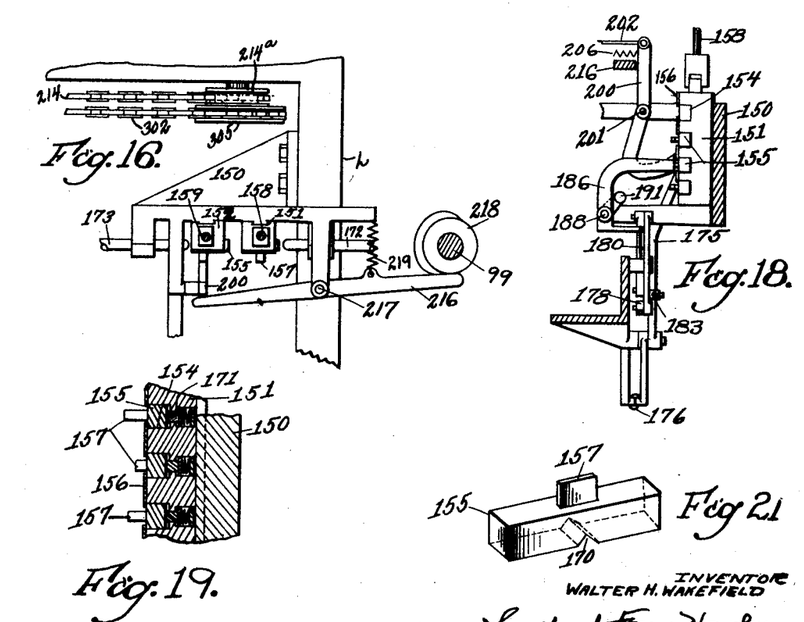
Fig. 16 is a plan view of certain parts, looking in the direction of the arrow 16 in Fig. 14.
Figs. 17, 18, and 19 are sectional end elevations of different parts, taken along the lines 17—17, 18—18, and 19—19, respectively, in Fig. 14.
Fig. 21 is a perspective view of one of the shuttle indicating blocks.
Figure 17:
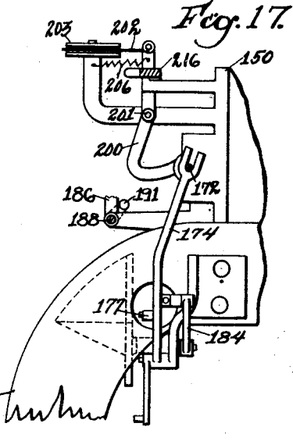
Figure 20:
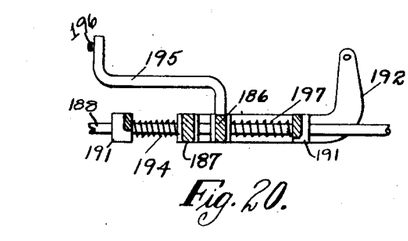
Fig. 20 is a detail sectional plan view, taken along the line 20—20 in Fig. 14.

It is essential that no block 155 shall be picked or moved to the opposite support unless the recess or box aligned therewith is empty. To determine this fact, I provide a pair of detecting fingers 186 and 187 (Figs. 14 and 18). These fingers are yieldingly mounted on a rock shaft 188 (Fig. 14) having an arm 189 engaged by a cam 190 on the shaft 99. Offset arms 191 are fixed to the rock shaft 188 and act to swing the fingers 186 and 187 away from the indicating blocks during movement thereof, such outward movement being caused by the cam 190. The detecting finger 187 has a depending offset projection 192 (Figs. 14 and 20) connected by a cord 193 (Fig. 14) to the hook 177 through which the plunger 172 is actuated to move the indicating block 155 to the left in Fig. 14. Whenever the detecting finger 187 engages a block 155 after being released by the offset arm 191, the finger 187 holds the hook 177 raised so that the plunger 172 remains inoperative. If the finger 187 does not engage an indicating block, it permits the hook 177 to move into engagement with the hook 178 and the plunger 172 is thereby actuated to transfer an indicating block 155 to the left in Fig. 14. A spring 194 moves the finger 187 yieldingly toward detecting position.

The detecting finger 186 is similarly connected through an offset arm 195 (Fig. 20) and a cord 196 (Fig. 14) to the hook 181 by which the plunger 173 is actuated. A spring 197 (Fig. 20) moves the finger 186 yieldingly toward detecting position. When no indicating block is engaged by the finger 186, the hook 181 is lowered and the plunger 173 is actuated as previously described.

*Color indication.*

Figure 15:
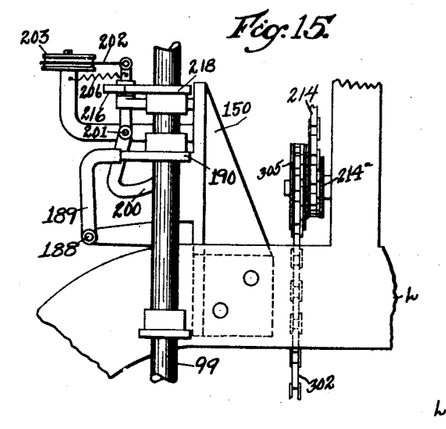
Fig. 15 is an end elevation of certain parts, looking in the direction of the arrow 15 in Fig. 14.

I will now describe the connections by which a color indication is derived from the indicator blocks 155. For this purpose an indicating arm 200 (Fig. 18) is mounted on a fixed pivot 201 and is attached to a cord or flexible element 202. This cord 202 passes around a guide pulley 203 (Fig. 15) thence to a second guide pulley 204 (Fig. 1) and a third guide pulley 205 to a rearwardly extended arm of the bell crank 108 (Fig. 11). This bell crank actuates the sliding rock shaft 107 by which the lifting fingers 106 are moved to select a weft carrier of the desired color.

The indicator arm 200 is moved yieldingly toward the active indicator block 155, which corresponds to the shuttle which is about to be picked to the magazine side of the loom, by a spring 206, until the lower end of the arm 200 engages the lug or projection 157 on the face of the block 155. This projection by its height indicates the particular shuttle to which it corresponds. The position of the indicating arm 200, as thus determined, acts through the cord 202 and bell crank 108 to correspondingly position the rock shaft 107 on the magazine. The rock shaft will thus be moved to correspond with the shuttle about to be picked toward the magazine and at a time slightly prior to the actual flight of the shuttle.

Figures 1, 3, 3A, 4:
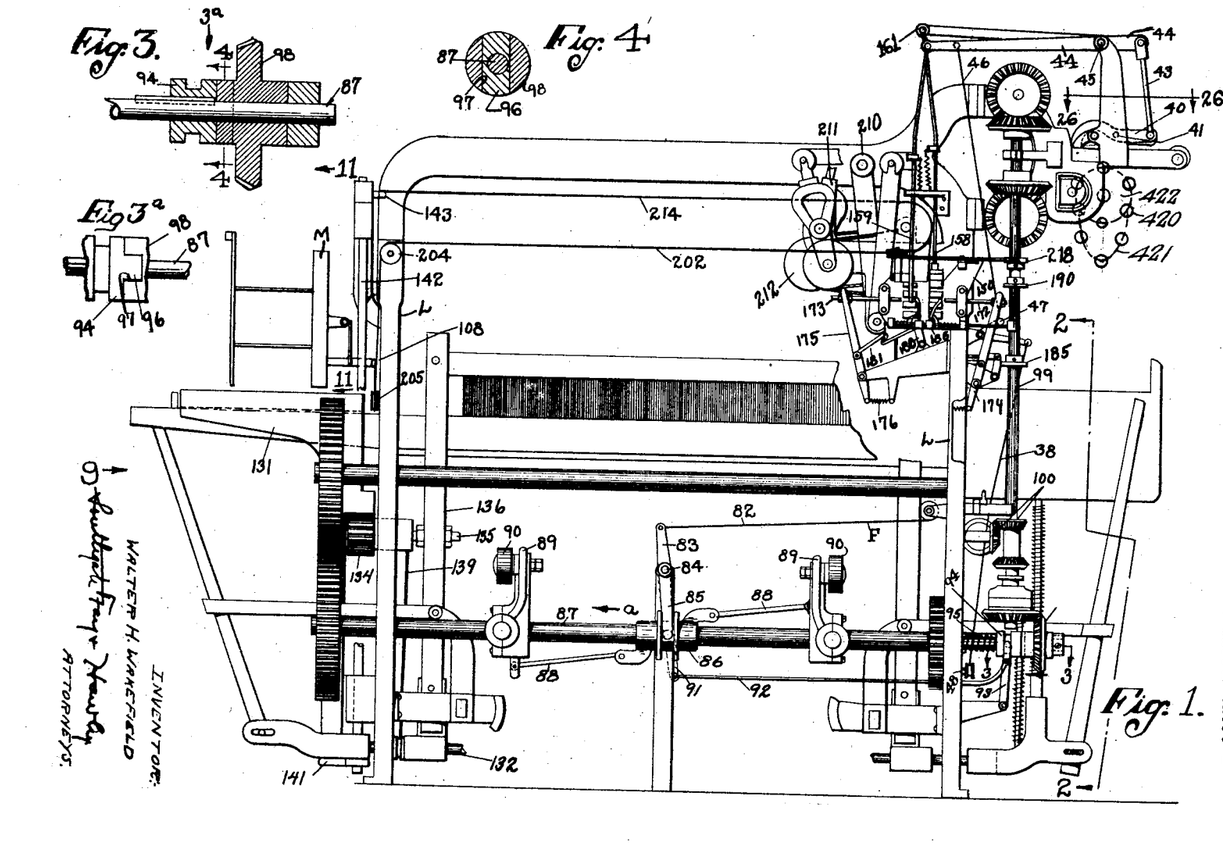
Fig. 1 is a rear elevation of my improved loom.
Fig. 3 is an enlarged detail sectional plan view, taken along the line 3—3 in Fig. 1.
Fig. 4 is a transverse section, taken along the line 4—4 in Fig. 3.

The shifting shuttle boxes 130 (Fig. 9) on the magazine end of the lay are correspondingly positioned to receive the shuttle by the operation of two box-positioning levers 210 and 211 (Fig. 1). Lever 211 has a pulley 212 pivoted thereon and lever 210 has attached thereto as at 213 a box lifting chain or cord 214 which passes around pulley 212. Cord 214 is led under pulley 214ª (Fig. 16) and over pulley 214ᵇ (Fig. 14) and is secured at its other end to the arm 143 at the upper end of the shaft 142 (Fig. 9) previously described. The levers 210 and 211 are rocked to correspond to the changes indicated by the box motion chain by connections (not shown) which are old and well known in the art, and by their connection through the cord 214 cause corresponding movement of the shifting shuttle boxes 130 at the magazine side of the loom.

Box lever 300 similar to lever 210 has secured thereto as at 301 a box lifter chain 302 which is led around pulley 303 on lever 304, and over pulley 305 to the drop boxes 53 to which it is attached by connections not shown. Said levers 300 and 304 are controlled by pattern mechanism by connections not shown but well understood in the art.

It is essential that the indicator arm 200 be withdrawn from engagement with the indicator blocks while the blocks are shifted either vertically or horizontally, and for this purpose I provide a lever 216 (Fig. 14) pivoted at 217 and engaging the arm 200 at one end of the lever. The other end of the lever 216 engages a cam 218 (Fig. 16) mounted on the dobby drive shaft or box motion shaft 99. A spring 219 holds the lever 216 against cam 218 and spaced slightly from lever 200 when the latter is in engagement with the block 155 having the lowest boss 157. As soon as the high point of the cam 218 is passed, the indicating arm is released to indicate the desired color to the magazine.

Immediately prior to the movement of the vibrators 42 to their new position, the blocks 155 are placed in accordance with their corresponding shuttles in the supports 151 and 152. As the vibrators move, the supports will also move and the blocks will be in the same relative positions as the shuttles they represent will eventually assume before picking. The block corresponding to the active shuttle will therefore be opposite the adjacent plunger and in position to give the color indication to the magazine. For this reason the lever 200 can be moved toward the block as soon as desired after the vibrators stop moving. Said lever must be in engagement with the active blocks when the lay reaches front center, as the weft detector operates at this time and the color slide 107 must be placed. Said color slide and lever 200 retain their positions until some time after the lay has passed front center to permit shuttle feeler 122 to descend. It is necessary to give the block 155 opposite the plunger a movement corresponding to the movement of the active shuttle before the vibrators move again. This can be done any time after the lever 200 is moved away from the block. Preparatory to the movement of the block the fingers 186 and 187 are moved to detect which block space is empty and this detection takes place before the lever 200 is moved rearwardly. As a result of the detection the proper pair of hooks are interlocked. The cam 185 must move the hooks together (and consequently the corresponding plunger) to cause engagement thereof before the fingers are moved away from the block but thereafter the movement of the blocks must be delayed until the finger and lever 200 are clear of said blocks. A brief dwell on cam 185 accomplishes this result, after which the plungers continue their movement and the blocks are moved to a position corresponding to the position the shuttles occupy after the flight of the shuttle which was detected on the front center immediately preceding. The parts have now completed a cycle of movements and are again ready for the next pick. No false movement of the magazine will result if no block appears under lever 200 as under this condition no shuttle will be on the drop box end of the loom and therefore no indication can be given.

*Operation.*

Having described the details of construction of the several parts of my invention, I will now briefly describe the general operation thereof. The indicating blocks 155 in the sliding support 151 (Fig. 14) correspond in position to the shuttles then located at the magazine side of the loom in the shuttle boxes 130, and the indicating blocks in the sliding support 152 correspond to the positions of the shuttles then located at the opposite or drop box side of the loom. The block 155 in the support 152 which is aligned with the plunger 173 corresponds to the shuttle about to be picked to the magazine side of the loom, this block being selected in accordance with indications from the drop box pattern chain.

By the same indication, the weft detector 57 is moved opposite the corresponding shuttle in the drop boxes 53 and determines the condition of the weft supply in said shuttle. If the weft supply is substantially exhausted, the detector causes the shaft 69 (Fig. 5) to be rocked, thus moving an indicating pin 220 (Fig. 6) into the path of an actuator 221 which normally swings about a floating pivot 222. When the pin 220 is in the path of the actuator, the link 223 (Figs. 6 and 12) is brought downward to release the lowermost bobbin B, all of these parts being of the usual construction. See Patent to Ryon, No. 1,030,748.

The movement of the actuator 221 is so timed that the indicated shuttle will make its flight to the magazine side of the loom as the bobbin is being released and prior to the action of the transferrer 146 (Fig. 11). At the same time, the arm 72 (Fig. 2) is released to engage the sliding rod 75 as the lay moves back, thereby stopping the picking mechanism, the dobby, the takeup, and the box motion for one whole pick during which the bobbin transfer occurs. After one complete revolution of the clutch collar 94 (Figs. 3 and 4) the parts of the clutch re-engage and the regular operation of the loom is resumed.

The movements of the indicator blocks 155 correspond exactly to the movements of the shuttles which they represent and simulate the movements of the shuttles from box to box. It is thus possible to use seven shuttles in a 4 x 4 loom having eight shuttle boxes, as it is not necessary that the same shuttle shall always occupy the same shuttle box. This free movement of the shuttles is made possible by the fact that the color indication is dependent only upon the position of the corresponding shuttle and not in any way upon the position of the shifting shuttle boxes at either end of the lay.

The function of the indicator blocks 155 is to give an exact representation of the positions of the different shuttles and to give such indication in advance of the actual movement of the shuttles so that the color indication may be made earlier than would otherwise be possible.

Considerable time is also saved by indicating the condition of weft in the shuttle about to be picked, as the drop boxes are moving the shuttle toward picking position. The movements of the blocks 155 and the detector stand 30 being indicated direct from the pattern chain, are substantially a half pick or revolution in advance of the corresponding movements of the shuttle boxes, giving ample time to indicate the color of the running shuttle and to adjust the sliding rock shaft 107 of the magazine prior to release of a bobbin by the actuator 221.

The magazine differs somewhat from the more usual type, as previously explained, by having a bobbin normally resting upon the releasing slide bars or supports, so that a single movement only is required to drop a bobbin to transfer position. When a transfer is indicated, the latch 117 (Fig. 11) is raised into the path of the bunter 118 on the lay and is held there by the toggle arms 120 until the toggle is reversed by movement of the shuttle feeler 122 as the lay nears front center.

A manifest advantage of my invention lies in the control of the indicating blocks and of the drop box mechanism from the same indicating pattern surface, resulting in accurate coordination in the movements and timing of these different mechanisms.

Having thus described my invention and the many advantages thereof, I do not wish to be limited to the details herein disclosed otherwise than as set forth in the claims, but what I claim is:—

1. A weft replenishing pick and pick loom having, in combination, a lay, a plurality of shuttles, a set of shifting shuttle boxes at each end of the lay, means to pick a shuttle from either end of the lay on any pick, a multi-color magazine at one end of the lay, means to select a weft carrier corresponding in color to the running shuttle, and means to transfer said weft carrier to the running shuttle, said selecting means being operatively associated with the active shuttle in whatever box said shuttle may be positioned and being controlled directly from the same pattern surface which determines the drop box changes.

2. A weft replenishing pick and pick loom having, in combination, a lay, a plurality of shuttles, a set of shifting shuttle boxes at each end of the lay, means to pick a shuttle from either end of the lay on any pick, a multi-color magazine at one end of the lay, means to select a weft carrier corresponding in color to the running shuttle, and means to transfer said weft carrier to the running shuttle, said selecting means being operatively associated with the active shuttle in whatever box said shuttle may be positioned and comprising a series of indicating elements corresponding in number to the number of shuttles in the shuttle boxes, and means to give each of said indicating elements a movement corresponding to every movement of the shuttle represented thereby with respect to the lay.

3. A loom as set forth in claim 2, in which the movements of each indicating element occur in advance of the corresponding movements of the shuttle represented thereby.

4. A loom as set forth in claim 2, in which each indicating element has a distinguishing characteristic corresponding to the shuttle represented thereby and determining the color of the weft carrier to be released therefor from said magazine.

5. A weft replenishing pick and pick loom having, in combination, a lay, a plurality of shuttles, a set of shifting shuttle boxes at each end of the lay, means to pick a shuttle from either end of the lay on any pick, a multi-color magazine at one end of the lay, means to select a weft carrier corresponding in color to the running shuttle, and means to transfer said weft carrier to the running shuttle, said selecting means being operatively associated with the active shuttle in whatever box said shuttle may be positioned and comprising a series of indicating elements corresponding in number to the number of shuttles in use, two series of receptacles for said indicating elements, each corresponding in number to the number of boxes in one set of shifting shuttle boxes, means to move each set of receptacles to correspond to the positions of the associated set of shuttle boxes, and means to move the indicating elements from one receptacle to another to correspond to the movements of the shuttles represented thereby.

6. A loom as set forth in claim 5, in which means is provided for moving a selected indicating element corresponding to the running shuttle in either direction prior to movement of the shuttle in the corresponding direction.

7. A loom as set forth in claim 5, in which means is provided for moving a selected indicating element corresponding to the running shuttle in either selected direction prior to the corresponding movement of the shuttle, and in which means is provided to prevent movement of an indicating element to a receptacle already occupied.

8. A weft replenishing pick and pick loom having, in combination, a lay, a plurality of shuttles, a set of shifting shuttle boxes at each end of the lay, means to pick a shuttle from either end of the lay on any pick, a multi-color magazine at one end of the lay, means to select a weft carrier corresponding in color to the running shuttle, and means to transfer said weft carrier to the running shuttle, said selecting means being operatively associated with the active shuttle in whatever box said shuttle may be positioned and comprising a plurality of indicating blocks corresponding in number to the number of shuttles in use, each block having a projection thereon and said projections being of different heights and each being characteristic of the particular shuttle represented thereby.

9. A weft replenishing pick and pick loom having, in combination, a lay, a plurality of shuttles, a set of shifting shuttle boxes at each end of the lay, means to pick a shuttle from either end of the lay on any pick, a multi-color magazine at one end of the lay, means to select a weft carrier corresponding in color to the running shuttle, and means to transfer said weft carrier to the running shuttle, said selecting means being operatively associated with the active shuttle in whatever box said shuttle may be positioned and comprising a plurality of indicating blocks corresponding in number to the number of shuttles in use, and means for moving each block to correspond to every movement of the shuttle represented thereby with respect to the lay but in advance of such movement.

10. A loom as set forth in claim 2, in which a color indicating detector engages the indicating element representing the running shuttle, in advance of a flight of said shuttle to the magazine side of the loom, and in which connections are provided from said color indicating detector to said magazine effective to cause release of a corresponding weft carrier from said magazine upon indication of weft exhaustion.

11. A weft replenishing pick and pick loom having, in combination, a multi-color magazine, a plurality of shuttles, two sets of shifting shuttle boxes, an indicating element corresponding to each shuttle in use, means to move each element to correspond to each movement of the shuttle represented thereby with respect to the lay, means controlled by said indicating element effective to set said magazine to release a weft carrier of corresponding color, a weft detector effective to detect substantial exhaustion of weft in the running shuttle, and transfer controlling connections from said weft detector to said magazine.

12. In a weft replenishing loom operating with a plurality of shuttles, a multicolor magazine, a plurality of shifting shuttle boxes at each side of the loom, a plurality of indicating elements, one element being assigned to each shuttle and each element having distinguishing characteristics, means to give said elements movements similar to all movements of the corresponding shuttles with respect to the lay, and color selecting mechanism controlled by said elements.

13. In a weft replenishing loom operating with a plurality of shuttles, a multicolor magazine, a plurality of shifting shuttle boxes at each side of the loom, a plurality of indicating elements, one element being assigned to each shuttle and each element having distinguishing characteristics, means to give said elements movements similar to all movements of the corresponding shuttles with respect to the lay, and color selecting mechanism operatively controlled by the element corresponding to the active shuttle.

14. In a weft replenishing loom operating with a plurality of shuttles, a multicolor magazine, a plurality of shifting shuttle boxes at each side of the loom, a plurality of indicating elements, one element being assigned to each shuttle and each element having distinguishing characteristics, means to give said elements movements similar to all movements of the corresponding shuttles with respect to the lay but prior to the movements of said shuttles, and color selecting mechanism controlled by said elements.

15. In a weft replenishing loom operating with a plurality of shuttles, a multicolor magazine, a plurality of shifting shuttle boxes at each side of the loom, a plurality of indicating elements, one element being assigned to each shuttle and each having a distinguishing characteristic, means to give said elements movements similar to all movements of the corresponding shuttles with respect to the lay but prior to the movements of said shuttles, and weft replenishing mechanism operatively controlled by the element corresponding to the active shuttle.

16. In a weft replenishing loom, in combination, a plurality of shifting shuttle boxes at each end of said loom, a plurality of shuttles, an indicating element assigned to each shuttle, and having a distinguishing characteristic, means to give said elements movements similar to all movements of their corresponding shuttles with respect to the lay, and weft replenishing mechanism controlled by said elements.

17. In a weft replenishing loom, in combination, a plurality of shifting shuttle boxes at each end thereof, a plurality of shuttles, an indicating element assigned to each shuttle, means to give said elements movements similar to all movements of their corresponding shuttles but prior to the movements of the shuttles with respect to the lay, and weft replenishing mechanism controlled by said elements and operatively connected to the element corresponding to the active shuttle.

18. In a weft replenishing loom, in combination, a plurality of shifting shuttle boxes at each end of said loom, a plurality of shuttles greater in number than the number of shuttle boxes at either end of the loom, an indicating element assigned to each shuttle, means to give said elements movements similar to all movements of their corresponding shuttles with respect to the lay, and weft replenishing mechanism controlled by said elements.

19. In a weft replenishing loom, in combination, a plurality of shifting shuttle boxes at each end of said loom, a plurality of shuttles greater in number than the number of shuttle boxes at either end of the loom, an element assigned to each shuttle and each having a distinguishing characteristic, means to give said elements movements similar to all movements of their corresponding shuttles with respect to the lay, and weft replenishing mechanism operatively controlled by the element corresponding to the active shuttle.

20. In a weft replenishing loom, in combination, a plurality of shifting shuttle boxes at each end of said loom, a plurality of shuttles greater in number than the number of shuttle boxes at either end of the loom, an indicating element assigned to each shuttle, means to give said elements movements similar to all movements of their corresponding shuttles with respect to the lay but prior to the movements of the shuttles, and weft replenishing mechanism controlled by said elements.

21. In a weft replenishing pick and pick loom, in combination, a plurality of shifting shuttle boxes at each end of the loom, a plurality of shuttles greater in number than the boxes at either end of the loom, weft replenishing mechanism to supply weft of differing characters to said plurality of shuttles, selective means to determine the character of filling to be supplied, a pattern surface effective to determine the sequence in which the shuttles shall become active, and connections from the same pattern surface to said selective means, whereby said selective means is coordinated with the active shuttles.

22. In a weft replenishing pick and pick loom, in combination, a plurality of shifting boxes at each end of the loom, a plurality of shuttles greater in number than the number of boxes at either end of the loom and each movable to active position, weft replenishing mechanism to supply weft of differing characteristics to different shuttles, a single pattern surface, and connections therefrom effective to control the shifting of the shuttle boxes and also effective to control the selective operation of the replenishing mechanism.

23. In a weft replenishing loom operating with a plurality of shuttles, a plurality of indicating elements, means to move said elements to similate all movements of the shuttles with respect to the lay, and weft replenishing mechanism under control of said elements.

24. In a weft replenishing loom operating with a plurality of shuttles, a plurality of indicating elements, means to move said elements to similate all movements of the shuttles with respect to the lay, before said movements take place, and weft replenishing mechanism under control of said elements.

25. In a weft replenishing loom, in combination, a plurality of shifting shuttle boxes at each end of the loom, a plurality of shuttles greater in number than the boxes at either end of the loom, weft replenishing mechanism to supply weft of differing colors or characteristics, a selector for said replenishing mechanism to determine which color or character of weft shall be replenished, shuttle shifting mechanism, and pattern mechanism, the operation of said color selector and said shifting mechanism being jointly determined by the same pattern surface in said pattern mechanism.

26. In a weft replenishing loom having shifting shuttle boxes at each end thereof and a plurality of shuttles greater in number than the number of boxes at either end, devices having movements similar to and in anticipation of all movements of said shuttles with respect to the lay, and multi-color weft replenishing mechanism operatively connected to said devices.

27. In a weft replenishing loom having shifting shuttle boxes at each end thereof and a plurality of shuttles greater in number than the number of boxes at either end of the loom, in combination, weft replenishing mechanism to supply wefts of different characteristics to the shuttles, pattern mechanism to determine the sequence in which the shuttles shall become active, and an indicating device to control the replenishing mechanism to determine which character of filling shall be supplied, said indicating device assuming a plurality of settings, one for each shuttle.

In testimony whereof I have hereunto affixed my sinature.

WALTER H. WAKEFIELD.